(12) United States Patent
Chang et al.

(10) Patent No.: US 9,881,422 B2
(45) Date of Patent: Jan. 30, 2018

(54) VIRTUAL REALITY SYSTEM AND METHOD FOR CONTROLLING OPERATION MODES OF VIRTUAL REALITY SYSTEM

(71) Applicant: HTC CORPORATION, Taoyuan (TW)

(72) Inventors: Wei-Chih Chang, Taoyuan (TW);
Mong-Yu Tseng, Taoyuan (TW);
Iok-Kan Choi, Taoyuan (TW); Wan-Ju Tseng, Taoyuan (TW); Jing-Lung Wu, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 14/943,721

(22) Filed: Nov. 17, 2015

(65) Prior Publication Data

US 2016/0163110 A1 Jun. 9, 2016

Related U.S. Application Data

(60) Provisional application No. 62/087,593, filed on Dec. 4, 2014.

(51) Int. Cl.
*G09G 5/00* (2006.01)
*G06T 19/00* (2011.01)
(Continued)

(52) U.S. Cl.
CPC .......... *G06T 19/006* (2013.01); *G02B 27/017* (2013.01); *G02B 27/0172* (2013.01);
(Continued)

(58) Field of Classification Search
CPC ......... G06T 19/006; G06T 19/00; G06T 7/73; G06T 7/20; G06T 7/60; G06F 3/011;
(Continued)

(56) References Cited

U.S. PATENT DOCUMENTS

| | | | | |
|---|---|---|---|---|
| 5,844,824 A | * | 12/1998 | Newman | G06F 3/011 345/156 |
| 5,856,667 A | * | 1/1999 | Spirig | G01S 17/36 250/208.1 |

(Continued)

FOREIGN PATENT DOCUMENTS

GB 2376397 A 12/2002

*Primary Examiner* — Abderrahim Merouan
(74) *Attorney, Agent, or Firm* — Birch, Stewart, Kolasch & Birch, LLP (57) ABSTRACT

A virtual reality system is provided. The virtual reality system includes a host device, a transmission cable, and a head mounted display apparatus worn by a user and coupled to the host device via the transmission cable. The head mounted display apparatus includes a multimedia module, a multi-sensing module, and a peripheral hub. The multimedia module receives multimedia content from the host device via the transmission cable, and displays a video part of the multimedia content. The multi-sensing module obtains sensing information regarding the head mounted display apparatus, the user and an obstruction. The peripheral hub provides the sensing information to the host device via the transmission cable. At least one virtual object of the video part of the multimedia content is adjusted in response to the sensing information.

19 Claims, 12 Drawing Sheets

(51) Int. Cl.
*G06F 3/01* (2006.01)
*G02B 27/01* (2006.01)
*G06K 9/52* (2006.01)
*G06T 7/20* (2017.01)
*G06T 7/60* (2017.01)
*G06F 3/0346* (2013.01)
*G06T 7/73* (2017.01)

(52) U.S. Cl.
CPC .......... *G02B 27/0179* (2013.01); *G06F 3/011* (2013.01); *G06F 3/013* (2013.01); *G06F 3/0346* (2013.01); *G06K 9/52* (2013.01); *G06T 7/20* (2013.01); *G06T 7/60* (2013.01); *G06T 7/73* (2017.01); *G09G 5/006* (2013.01); *G02B 2027/014* (2013.01); *G02B 2027/0134* (2013.01); *G02B 2027/0138* (2013.01); *G02B 2027/0187* (2013.01); *G09G 2370/16* (2013.01)

(58) Field of Classification Search
CPC ........ G06F 3/012; G06F 3/013; G06F 3/0346; G02B 27/017; G02B 27/0172; G02B 27/0179; G06K 9/52; G09G 5/006
See application file for complete search history.

(56) References Cited

U.S. PATENT DOCUMENTS

| | | | | |
|---|---|---|---|---|
| 6,084,556 A * | 7/2000 | Zwern | ................ | G09B 21/008 345/158 |
| 6,834,232 B1 * | 12/2004 | Malhotra | ............... | G08G 1/163 340/903 |
| 7,852,355 B2 * | 12/2010 | Friedrich | ................ | G06F 3/012 345/632 |
| 8,648,702 B2 * | 2/2014 | Pala | ..................... | G01S 7/4863 340/435 |
| 8,922,041 B1 * | 12/2014 | North | ....................... | F03D 7/00 244/153 R |
| 2003/0210228 A1 * | 11/2003 | Ebersole | ............... | G02B 27/017 345/157 |
| 2004/0016870 A1 * | 1/2004 | Pawlicki | ............... | G06K 9/4604 250/208.1 |
| 2008/0297437 A1 * | 12/2008 | Takahashi | ........... | G02B 27/017 345/8 |
| 2009/0033588 A1 * | 2/2009 | Kajita | .................. | G02B 27/017 345/2.3 |
| 2009/0290033 A1 * | 11/2009 | Jones | ............... | G08B 13/19693 348/218.1 |
| 2011/0121994 A1 * | 5/2011 | Pampus | ............... | B62D 15/027 340/932.2 |
| 2011/0187640 A1 | 8/2011 | Jacobsen et al. | | |
| 2011/0194029 A1 * | 8/2011 | Herrmann | ........... | G02B 27/017 348/569 |
| 2011/0205965 A1 * | 8/2011 | Sprigg | ................. | G06F 9/4411 370/328 |
| 2012/0154599 A1 * | 6/2012 | Huang | .................. | H04N 5/232 348/169 |
| 2013/0063550 A1 * | 3/2013 | Ritchey | ................. | G03B 37/00 348/36 |
| 2013/0093788 A1 * | 4/2013 | Liu | ........................ | G06F 3/011 345/633 |
| 2013/0222573 A1 * | 8/2013 | Onuma | .................... | E02F 9/24 348/82 |
| 2013/0293586 A1 | 11/2013 | Kaino et al. | | |
| 2013/0300637 A1 * | 11/2013 | Smits | .................... | G03B 35/18 345/8 |
| 2014/0049559 A1 * | 2/2014 | Fleck | .................. | G03H 1/2249 345/633 |
| 2014/0140579 A1 * | 5/2014 | Takemoto | ............... | G01C 3/08 382/106 |
| 2014/0147829 A1 * | 5/2014 | Jerauld | .................. | G06F 1/163 434/430 |
| 2015/0029042 A1 * | 1/2015 | Ikeya | .................... | G08G 1/052 340/934 |
| 2016/0209648 A1 * | 7/2016 | Haddick | ............ | G02B 27/0093 |

* cited by examiner

FIG. 11 ic # VIRTUAL REALITY SYSTEM AND METHOD FOR CONTROLLING OPERATION MODES OF VIRTUAL REALITY SYSTEM

CROSS REFERENCE TO RELATED APPLICATIONS

This application claims the benefit of U.S. Provisional Application No. 62/087,593, filed Dec. 4, 2014, the entirety of which is incorporated by reference herein.

BACKGROUND OF THE INVENTION

Field of the Invention

The invention relates to a virtual reality system, and more particularly to a head mounted display apparatus for a virtual reality system.

Description of the Related Art

Displays with virtual image generation are often used in display devices which are located close to the eyes, so-called near-to-eye displays. Such display devices are known, for example, as head mounted displays (HMD).

An HMD is a display device that a person wears on the head in order to have video information directly displayed in front of the eyes. HMDs are also known as near-to-eye displays. An HMD has either one or two small CRT, LCD or OLED displays with magnifying lenses and other optical elements. The displays and optics are typically embedded in a helmet, glasses, or a visor, which a user can wear. Lenses and other optical components are used to give the user the perception that the images are coming from a greater distance, to prevent eyestrain. In HMDs that use a single display, the image is typically projected through optics that split the image into two identical images, and redirects each image to the respective eye. With two displays, the HMD can show stereoscopic images. The stereoscopic images attempt to create depth in the images by simulating the angular difference between the images viewed by each eye when looking at an object, due to the different positions of the eyes. This angular difference is one of the key parameters the human brain uses in processing images to create depth perception or distance in human vision.

BRIEF SUMMARY OF THE INVENTION

A virtual reality system and a method for controlling the operation modes of a virtual reality system are provided. An embodiment of a virtual reality system is provided. The virtual reality system comprises a host device, a transmission cable, and a head mounted display apparatus worn by a user and coupled to the host device via the transmission cable. The head mounted display apparatus comprises a multimedia module, a multi-sensing module, and a peripheral hub. The multimedia module receives multimedia content from the host device via the transmission cable, and displays a video part of the multimedia content. The multi-sensing module obtains sensing information regarding the head mounted display apparatus, the user and an obstruction. The peripheral hub provides the sensing information to the host device via the transmission cable. At least one virtual object of the video part of the multimedia content is adjusted in response to the sensing information.

Furthermore, a method for controlling operation modes of a virtual reality system is provided. The virtual reality system comprises a host device, a head mounted display apparatus worn by a user, and a transmission cable coupled between the host device and the head mounted display apparatus. Multimedia content from the host device is received via the transmission cable by a multimedia module of the head mounted display apparatus. A video part of the multimedia content is displayed by the multimedia module of the head mounted display apparatus. Sensing information regarding the head mounted display apparatus, the user and an obstruction is obtained by a multi-sensing module of the head mounted display apparatus. The sensing information is provided to the host device via the transmission cable by a peripheral hub of the head mounted display apparatus. At least one virtual object of the video part of the multimedia is adjusted in response to the sensing information content.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
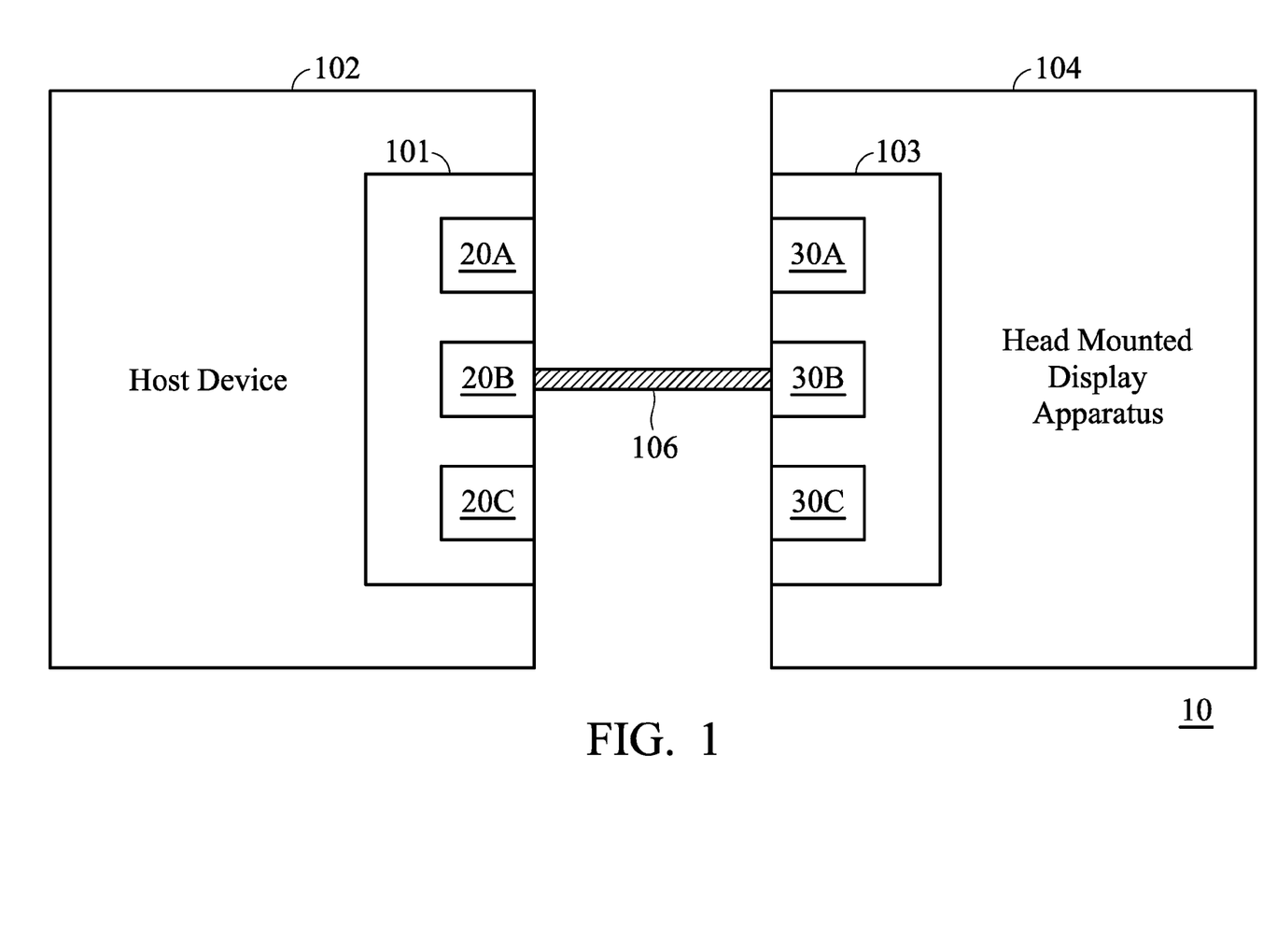
FIG. 1 shows a virtual reality system according to an embodiment of the invention.

FIG. 1 shows a virtual reality system 10 according to an embodiment of the invention. The virtual reality system 10 comprises a host device 102, a head mounted display apparatus 104 to be worn by a user, and a transmission cable 106 (optional) connected between an interface unit 101 of the host device 102 and an interface unit 103 of the head mounted display apparatus 104. The interface unit 101 of the host device 102 comprises a first host interface 20A for providing a multimedia content CXT to the head mounted display apparatus 104, a second host interface 20B for providing communication data DAT to the head mounted display apparatus 104, and a third host interface 20C for providing a power voltage PWR to power the head mounted display apparatus 104. Furthermore, the interface unit 103 of the head mounted display apparatus 104 has a first slave interface 30A capable of being coupled to the first host interface 20A via the transmission cable 106, a second slave interface 30B capable of being coupled to the second host interface 20B via the transmission cable 106, and a third slave interface 30C capable of being coupled to the third host interface 20C via the transmission cable 106. The head mounted display apparatus 104 is capable of playing the multimedia content CXT from the host device 102, and sensing information $INFO_S$ regarding the head mounted display apparatus 104 and/or the user. Based on the information sensed by the head mounted display apparatus 104, the host device 102 can timely modulate the multimedia content CXT. In one embodiment, the host device 102 is capable of processing a multimedia source and generating the multimedia content CXT according to the multimedia source and the information sensed by the head mounted display apparatus 104.

Figure 2:
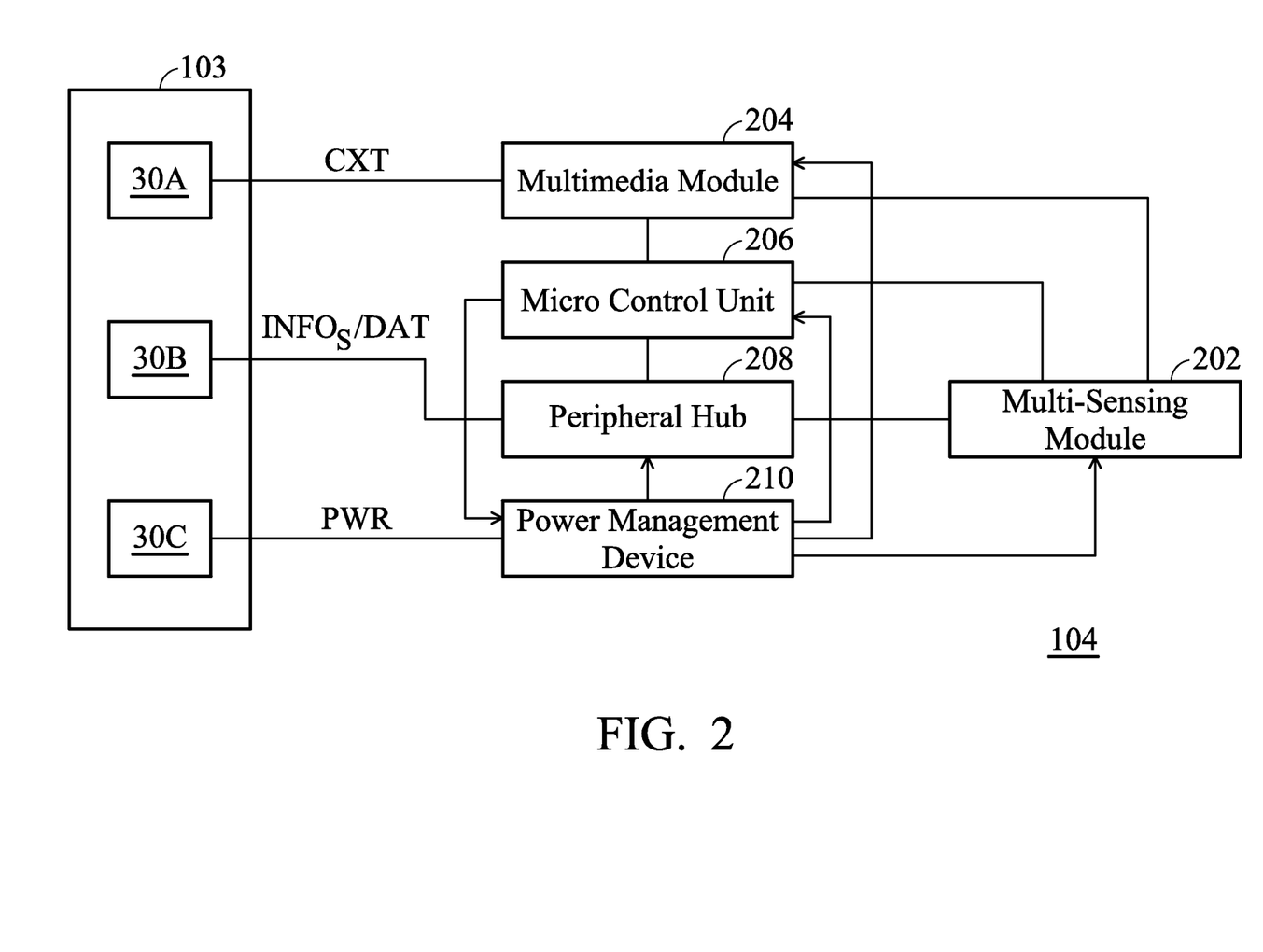
FIG. 2 shows an example of the head mounted display apparatus of FIG. 1 according to an embodiment of the invention.

FIG. 2 shows an example of the head mounted display apparatus 104 of FIG. 1 according to an embodiment of the invention. In the embodiment, the head mounted display apparatus 104 further comprises a multi-sensing module 202, a multimedia module 204, a micro control unit 206, a peripheral hub 208, and a power management device 210. The multi-sensing module 202 can sense the position of the user, the biometrical status of the user, and/or the environment surrounding the head mounted display apparatus 104 to generate the sensing information $INFO_S$ when the user is wearing the head mounted display apparatus 104. In an exemplary embodiment, the sensing information $INFO_S$ may comprise position information $INFO_P$, user information $INFO_U$, and/or environment information $INFO_E$. The position information $INFO_P$ can comprise movement information, orientation information, tilt angle information, and/or location information regarding the head mounted display apparatus 104. The user information $INFO_U$ can comprise biometrical information about the user and/or eye view information sensed by the multi-sensing module 202. Furthermore, the environment information $INFO_E$ can comprise images/video and/or depth information captured by the multi-sensing module 202.

In FIG. 2, the multimedia module 204 can receive the multimedia content CXT from the first host interface 20A of the host device 102 of FIG. 1 through the first slave interface 30A of the head mounted display apparatus 104. The multimedia module 204 can process and play the multimedia content CXT, e.g. audio, image, or video content. The multimedia module 204 can be coupled to the multi-sensing module 202, so as to obtain the sensing information $INFO_S$, and thus display parameters, such as brightness and refresh time, can be modulated by the multimedia module 204 according to the sensing information $INFO_S$. Furthermore, the micro control unit (MCU) 206 is electrically coupled to the multi-sensing module 202 and the multimedia module 204. The micro control unit 206 can issue control information to coordinate functions of the multi-sensing module 202 and the multimedia module 204 according to the communication data DAT from the host device 102. The micro control unit 206 can receive the sensing information $INFO_S$ from the multi-sensing module 202, and transmit the sensing information $INFO_S$ to the host device 102 via the peripheral hub 208 and the second slave interface 30B.

Referring to FIG. 1 and FIG. 2 together, the peripheral hub 208 can receive the communication data DAT from the second host interface 20B of the host device 102 through the second slave interface 30B of the head mounted display apparatus 104. The peripheral hub 208 is coupled to the multi-sensing module 202, so as to receive the sensing information $INFO_S$. Furthermore, the peripheral hub 208 is also coupled to the micro control unit 206, so as to receive the control information. The peripheral hub 208 may be coupled to a plurality of peripheral devices of the head mounted display apparatus 104, such as microphones, speakers, or an extended hub. The peripheral hub 208 can provide the sensing information $INFO_S$ to the second host interface 20B of the host device 102 through the second slave interface 30B of the head mounted display apparatus 104. Furthermore, the power management device 210 can be connected to the third host interface 20C of the host device 102 through the third slave interface 30C of the head mounted display apparatus 104, so as to receive the power voltage PWR from the host device 102. In the embodiment, the power management device 210 is connected to each component of the head mounted display apparatus 104 for powering the components, including the multi-sensing module 202, the multimedia module 204, the micro control unit 206, and the peripheral hub 208, and the wireless module 212. The power management device 210 comprises a plurality of power circuits, wherein each power circuit is capable of modulating a supply power according to the power voltage PWR from the host device 102, and providing the supply power to power the corresponding component according to the control information from the micro control unit 206. Specifically, the power management device 210 can perform power management control and peripheral control according to the control information from the micro control unit 206.

Figure 3:
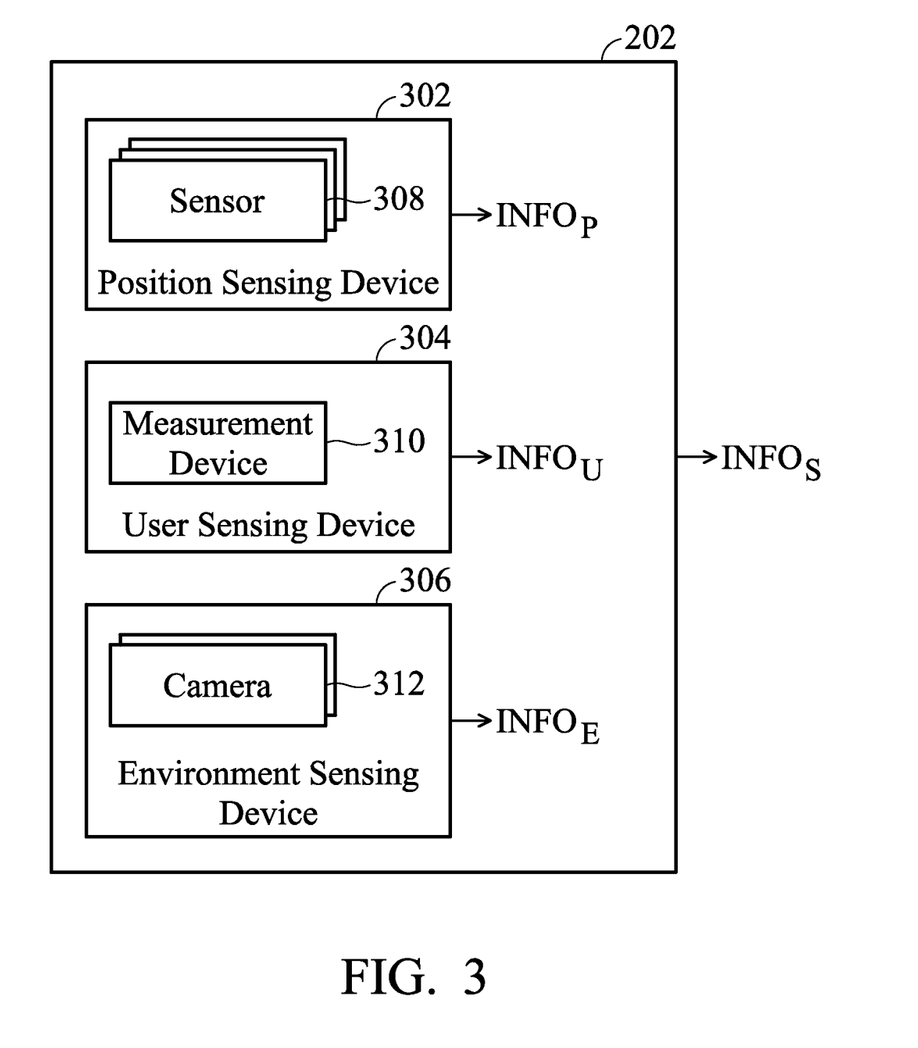
FIG. 3 shows an example of the multi-sensing module of FIG. 2 according to an embodiment of the invention.

FIG. 3 shows an example of the multi-sensing module 202 of FIG. 2 according to an embodiment of the invention. The multi-sensing module 202 comprises a position sensing device 302 for obtaining the position information $INFO_P$ corresponding to the head mounted display apparatus 104, a user sensing device 304 for obtaining the user information $INFO_U$, and/or an environment sensing device 306 for obtaining the environment information $INFO_E$, wherein the multi-sensing module 202 provides the sensing information $INFO_S$ according to the position information $INFO_P$, the user information $INFO_U$, and the environment information $INFO_E$. The position sensing device 302 comprises a plurality of sensors 308 for sensing the position information $INFO_P$ of the head mounted display apparatus 104. A position reference device can be located at a distance from the head mounted display apparatus 104, so as to wirelessly provide reference information to the position sensing device 302. Thus, the position sensing device 302 can use the reference information to generate the position information $INFO_P$. Furthermore, the user sensing device 304 comprises at least one measurement device 310 for sensing the user information $INFO_U$, such as an Inter-pupillary distance (IPD) measurement device for measuring eye view information of the user, e.g. a visual angle of the user. The environment sensing device 306 comprises at least two cameras 312 for capturing images/video of objects which the head mounted display apparatus 104 is facing, and obtaining the depth information of the objects in relative to the head mounted display apparatus 104. A depth map can be calculated by the head mounted display apparatus 104 or the host device 102 according to the depth information. Furthermore, the camera lens of the cameras 312 can be moved by the micro control unit 206, so as to obtain more depth information for the depth map. The cameras 312 are spatially separated apart from each other. The cameras 312 can capture images and generate parallax information of the captured images, wherein the field of view (FOV) of the cameras at least partially overlap so that the parallax information can be generated. The parallax information can be provided to the host device 102 as depth information, which can be calculated by the host device 102, so as to generate a depth map or a depth model of the space or object faced by the head mounted display apparatus 104. In one embodiment, the cameras 312 are disposed in a line. The cameras 312 are disposed on the head mounted display apparatus 104 according to a tilt angle. With the tilt angle, the cameras 312 can sense the lower region which the head mounted display apparatus 104 is facing. Moreover, the host device 102 is capable of monitoring a clear zone in which the head mounted display apparatus 104 is facing according to the depth information. Thus, the virtual reality system 10 is capable of alerting the user when the clear zone falls into a short distance range. For example, the head mounted display apparatus 104 and the host device 102 can alert the user to obstructions in a room.

Figure 4:
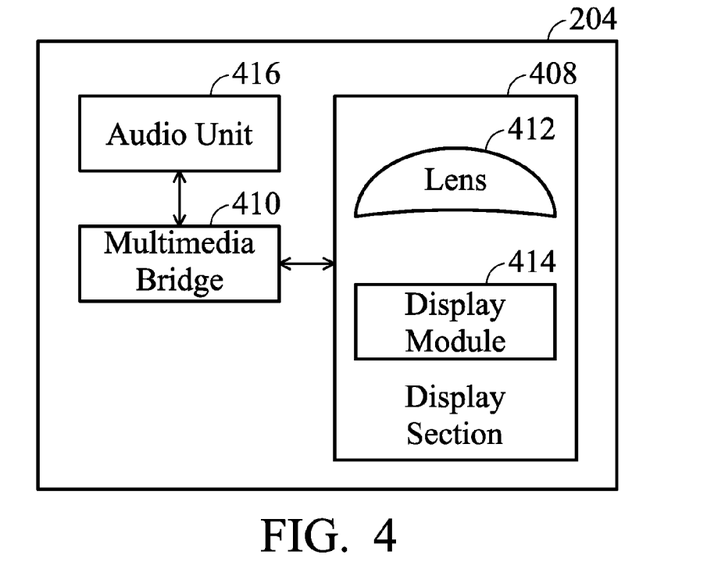
FIG. 4 shows an example of the multimedia module of FIG. 2 according to an embodiment of the invention.

FIG. 4 shows an example of the multimedia module 204 of FIG. 2 according to an embodiment of the invention. The multimedia module 204 can process and play the multimedia content CXT, e.g. audio, image, or video content. The multimedia module 204 comprises at least one display section 408 and a multimedia bridge 410. Each display section 408 can comprise a lens 412, and a display module 414. The audio unit 416 is capable of delivering audio sounds of the multimedia content CXT (i.e. the audio part of the multimedia content CXT) or recording sounds from the user or environment. The audio unit 416 is coupled to the multimedia bridge 410 for an audio playback function. Furthermore, referring to FIG. 4 and the FIG. 2 together, the audio unit 416 is coupled to the peripheral hub 208 for a microphone function when a microphone is coupled to the peripheral hub 208. The audio unit 416 may comprise an audio codec for coding/decoding audio signals of the multimedia content CXT, and for coding/decoding the signals of the microphone and/or a speaker/earphone coupled to the peripheral hub 208. The multimedia bridge 410 is coupled between the first slave interface 30A of the head mounted display apparatus 104 and the display section 408 for transforming the multimedia content CXT (e.g. the video part of the multimedia content) into display signals that are readable by the display section 408.

The head mounted display apparatus 104 may comprise a sensor (not shown) for monitoring whether the head mounted display apparatus 104 is being worn by a user. Furthermore, the sensor is also capable of transmitting a trigger signal to the micro control unit 206 according to the results of said monitoring operation showing that the head mounted display apparatus 104 is not being worn by the user. The sensor can be a capacitive sensor embedded inside the head mounted display apparatus 104 and facing inward for detecting whether the head mounted display apparatus 104 is being worn by the user. Moreover, the transmission cable 106 is coupled between the host device 102 and the head mounted display apparatus 104, and is capable of transmitting the multimedia content CXT, the communication data DAT, and the power voltage PWR from the host device 102 to the head mounted display apparatus 104. Furthermore, the transmission cable 106 can transmit the sensing information $INFO_S$ from the head mounted display apparatus 104 to the host device 102. Moreover, the multimedia content CXT, the communication data DAT, or the sensing information $INFO_S$ can be transmitted wirelessly between the host device 102 and the head mounted display apparatus 104 by using wireless communication technologies, e.g. WiGig technology.

Figure 5:
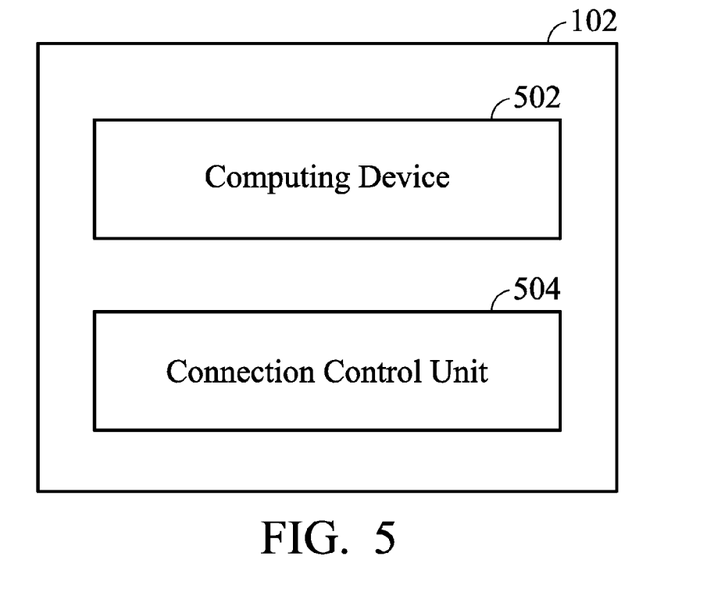
FIG. 5 shows an example of the host device of FIG. 1 according to an embodiment of the invention.

FIG. 5 shows an example of the host device 102 of FIG. 1 according to an embodiment of the invention. The host device 102 comprises a computing device 502 for generating the multimedia content CXT. The computing device 502 may be a personal computer, NB, or a smartphone or any other portable device with a powerful processor inside. The computing device 502 can receive a multimedia source from a storage unit or Internet network, and the computing device 502 is capable of generating the multimedia content CXT according to the multimedia source and the sensing information $INFO_S$ from the head mounted display apparatus 104. The computing device 502 is capable of generating the communication data according to the sensing information $INFO_S$. The host device 102 may further comprise a connection control unit 504 coupled between the computing device 502 and the transmission cable 106 of FIG. 1, wherein the connection control unit 504 is capable of enhancing the signal strength of the communication data DAT and/or the sensing information $INFO_S$ communicated between the computing device 502 and the connection control unit 504. Furthermore, the connection control unit 504 can connect to a power source, so that the connection control unit 504 is capable of transmitting the power voltage PWR to a power path of the transmission cable 106. The connection control unit 504 comprises a switch, which is used to control the supply of the multimedia content CXT, the communication data DAT, and/or the power voltage PWR to the transmission cable 106.

Figure 6:
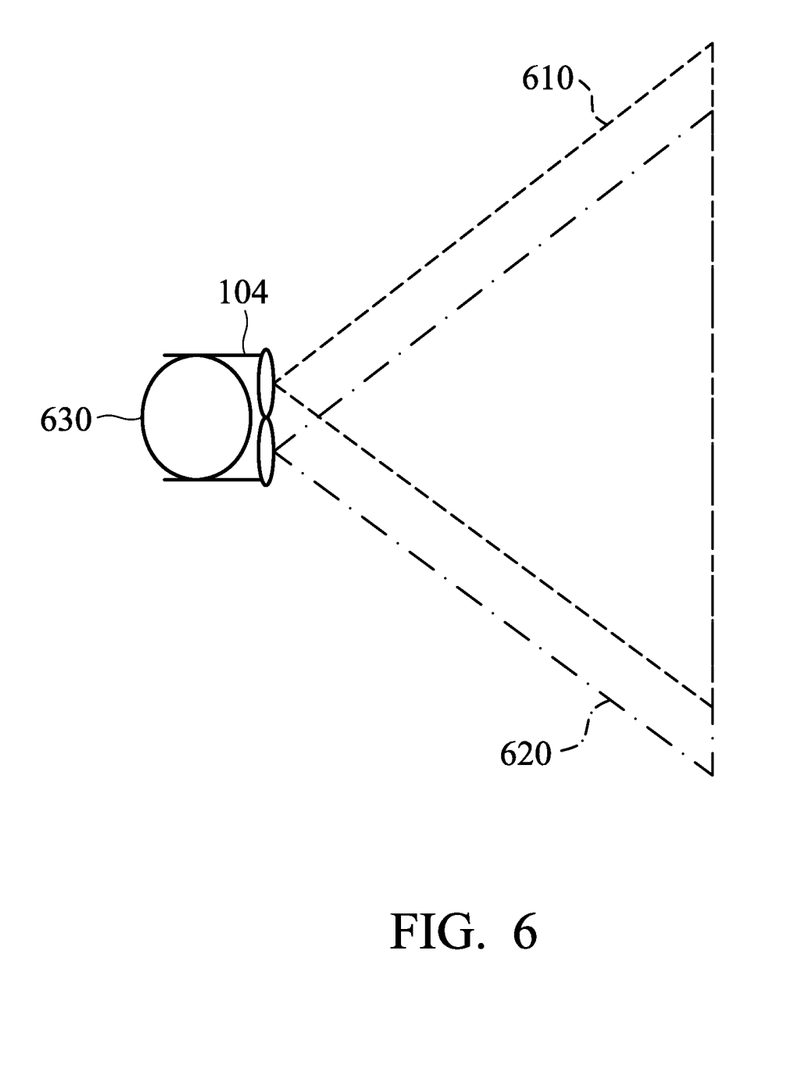
FIG. 6 shows an example of a top view illustrating field of view (FOV) of a camera in the head mounted display apparatus.

FIG. 6 shows an example of a top view illustrating field of view (FOV) of a camera 312 in the head mounted display apparatus 104. In FIG. 6, a user 630 is wearing the head mounted display apparatus 104, wherein one camera 312 of the head mounted display apparatus 104 is disposed near the left eye of the user 630, and the other camera 312 is disposed near the right eye of the user 630. Furthermore, the two cameras 312 are disposed in the same line. The camera 312 near the left eye has the FOV 610, and the camera 312 near the right eye has the FOV 620. Therefore, according to the images captured by the two cameras 312, the head mounted display apparatus 104 can obtain the parallax information, so as to generate a depth map or a depth model of the space where the user 630 is located.

Figure 7:
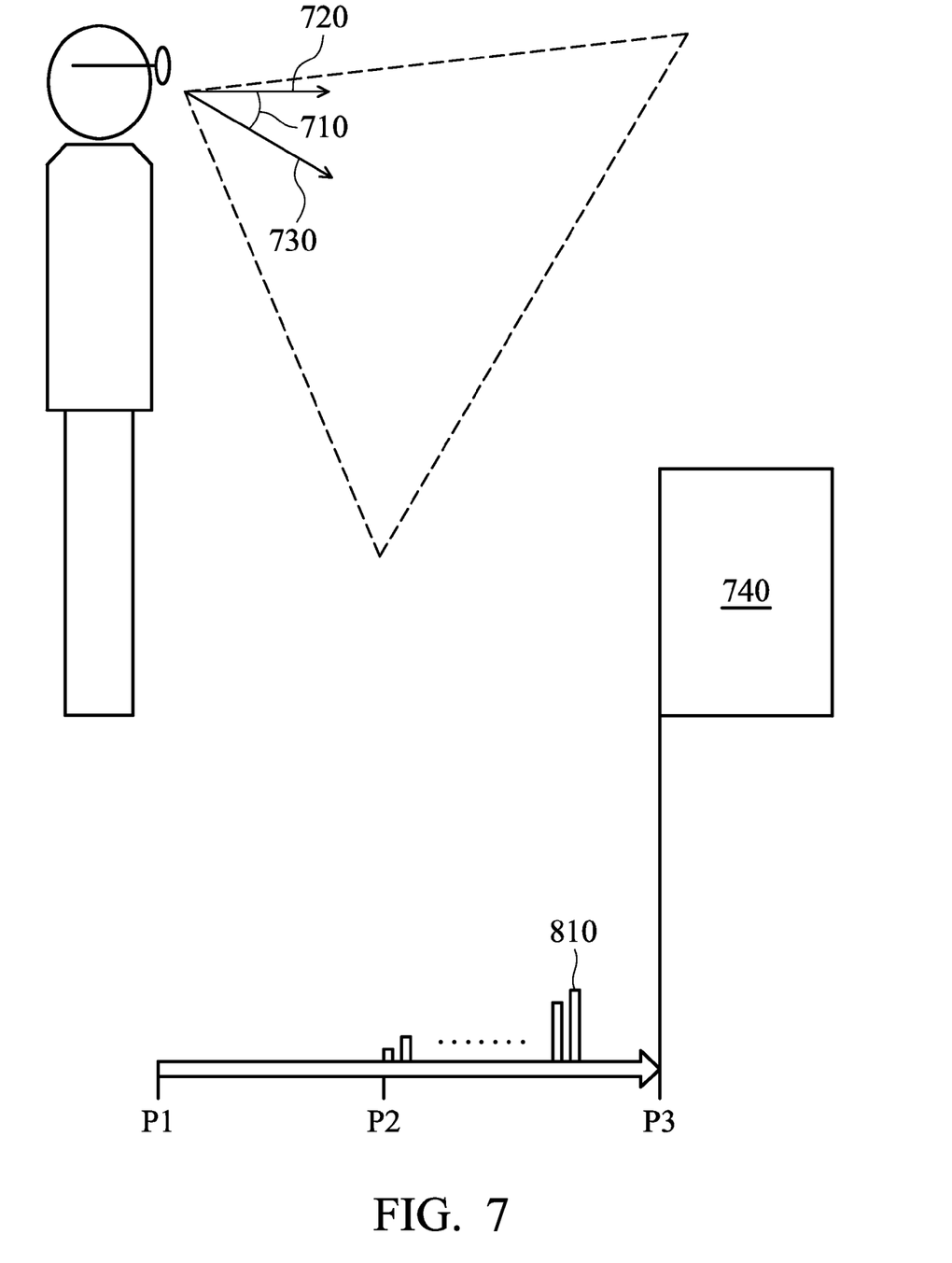
FIG. 7 shows an example of a schematic illustrating a tilt angle of a camera in the head mounted display apparatus.

FIG. 7 shows an example of a schematic illustrating a tilt angle 710 of the camera 312 in the head mounted display apparatus 104. In FIG. 7, the camera 312 is disposed on the head mounted display apparatus 104 according to the tilt angle 710, wherein the tilt angle 710 is determined according to the horizontal line 720 and the center line 730 of the field of view of the camera 312. The horizontal line 720 is parallel to a terrestrial line. With the tilt angle 710, the camera 312 can sense the lower region which the head mounted display apparatus 104 is facing, so as to detect any obstruction 740 to the user's movement. Thus, when the user wearing the head mounted display apparatus 104 moves and approaches the obstruction 740, the virtual reality system 10 is capable of alerting the user via the display module 414 of the display section 408 and/or the audio unit 416 according to the sensing information $INFO_S$. For example, a warning object is present when the user is close to the obstruction 740, wherein the speed and/or magnification at which the warning object is shown are determined according to the movement speed of the user and/or the distance to the obstruction 740.

Figure 8:
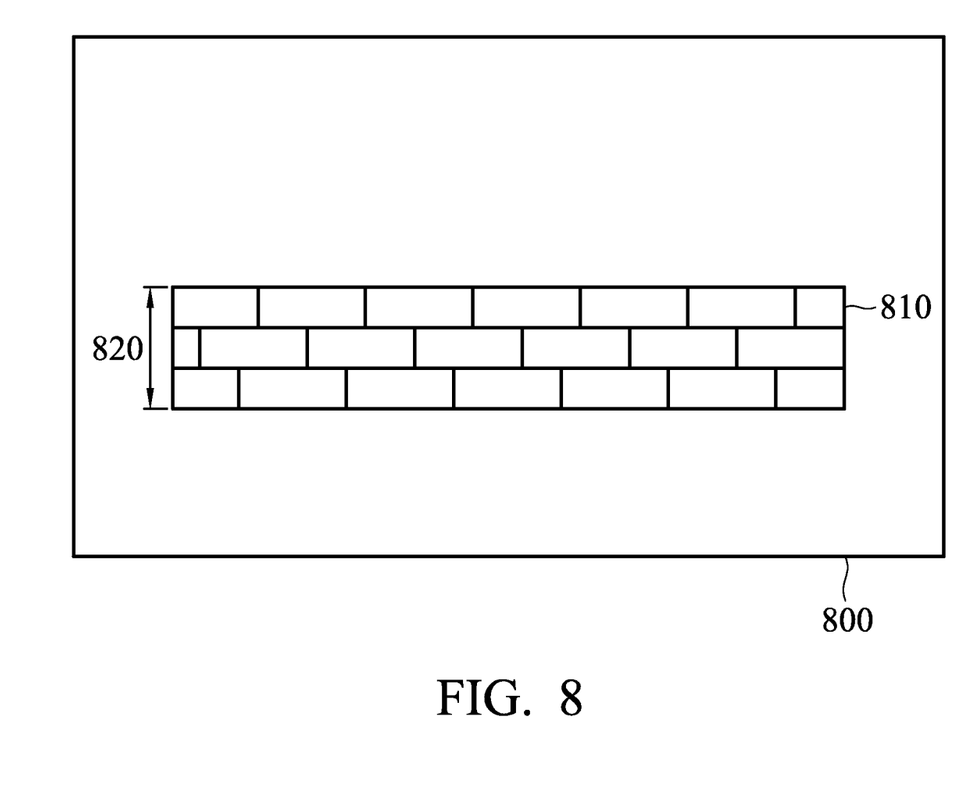
FIG. 8 shows an example of an image viewed by the user wearing the head mounted display apparatus when the user is close to the obstruction of FIG. 7.

FIG. 8 shows an example of an image 800 viewed by the user wearing the head mounted display apparatus 104 when the user is close to the obstruction 740 of FIG. 7. Referring to FIG. 7 and FIG. 8 together, when the user is located in position P1, no warning object is present in the image 800, wherein a distance between position P1 and the obstruction 740 is safe and sufficient for the user to move. If the user moves towards the obstruction 740 and the distance between the user and the obstruction 740 is decreased and is shorter than a specific distance, a warning object 810 is present in the image 800. In some embodiments, the distance between the user and the obstruction 740 is obtained according to the position information $INFO_P$, the user information $INFO_U$, and/or the environment information $INFO_E$. In FIG. 8, the warning object 810 is a virtual wall. Furthermore, the height 820 of the virtual wall is determined according to the distance between the user and the obstruction 740. For example, when the user is located between positions P2 and P3, the virtual wall is present in the image 800, wherein the height 820 of the virtual wall is decreased when the user is close to position P2, and the height 820 of the virtual wall is increased when the user is close to position P3.

Figure 9A:
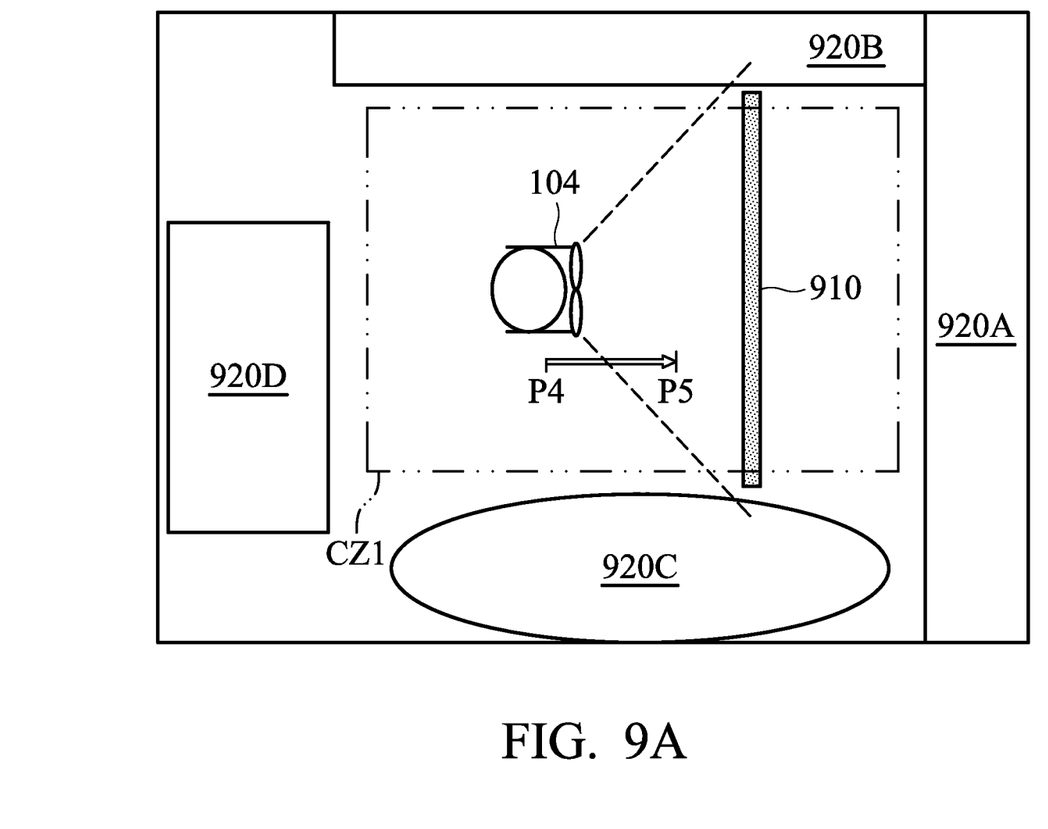
FIG. 9A shows an example of a top view of a small room.
Figure 9B:
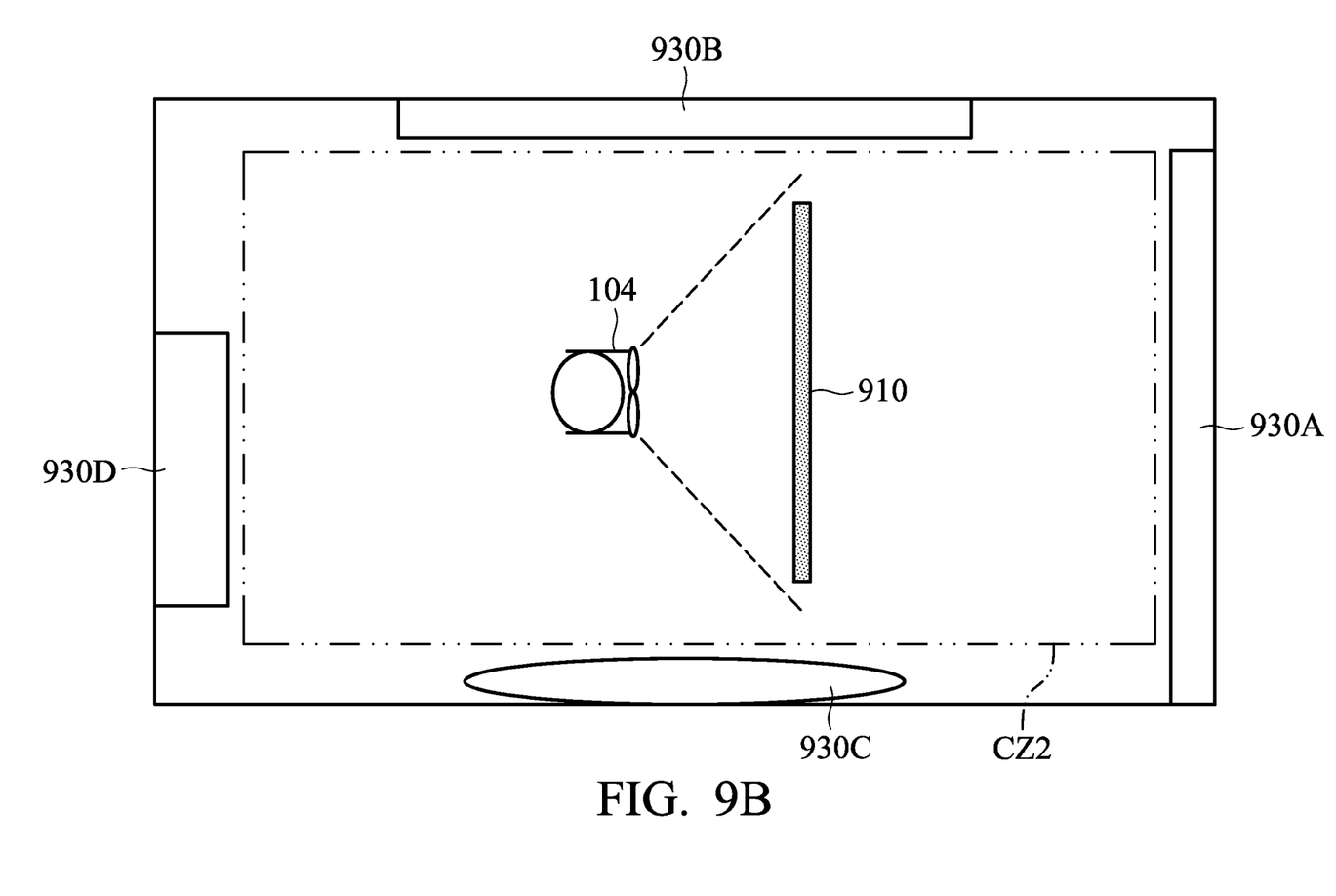
FIG. 9B shows an example of a top view of a large room.

According to the depth information and the obstructions, the host device 102 is capable of monitoring a clear zone which the head mounted display apparatus 104 is facing, wherein the clear zone is a safe range for the user to move, i.e. the user will not encounter any obstructions in the clear zone. FIG. 9A shows an example of a top view of a small room, and FIG. 9B shows an example of a top view of a large room. When the user is wearing the head mounted display apparatus 104 in the small room of FIG. 9A, the cameras 312 of the head mounted display apparatus 104 can obtain the depth information and the locations of the obstructions 920A-920D (e.g. furniture and/or appliances), and thus a clear zone CZ1 is obtained by the host device 102. Furthermore, when the user is wearing the head mounted display apparatus 104 in the large room of FIG. 9B, the cameras 312 of the head mounted display apparatus 104 can obtain the depth information and the locations of the obstructions 930A-930D, and thus a clear zone CZ2 is obtained by the host device 102. In FIG. 9A and FIG. 9B, label 910 represents the image seen by a user wearing the head mounted display apparatus 104.

Figure 10A:
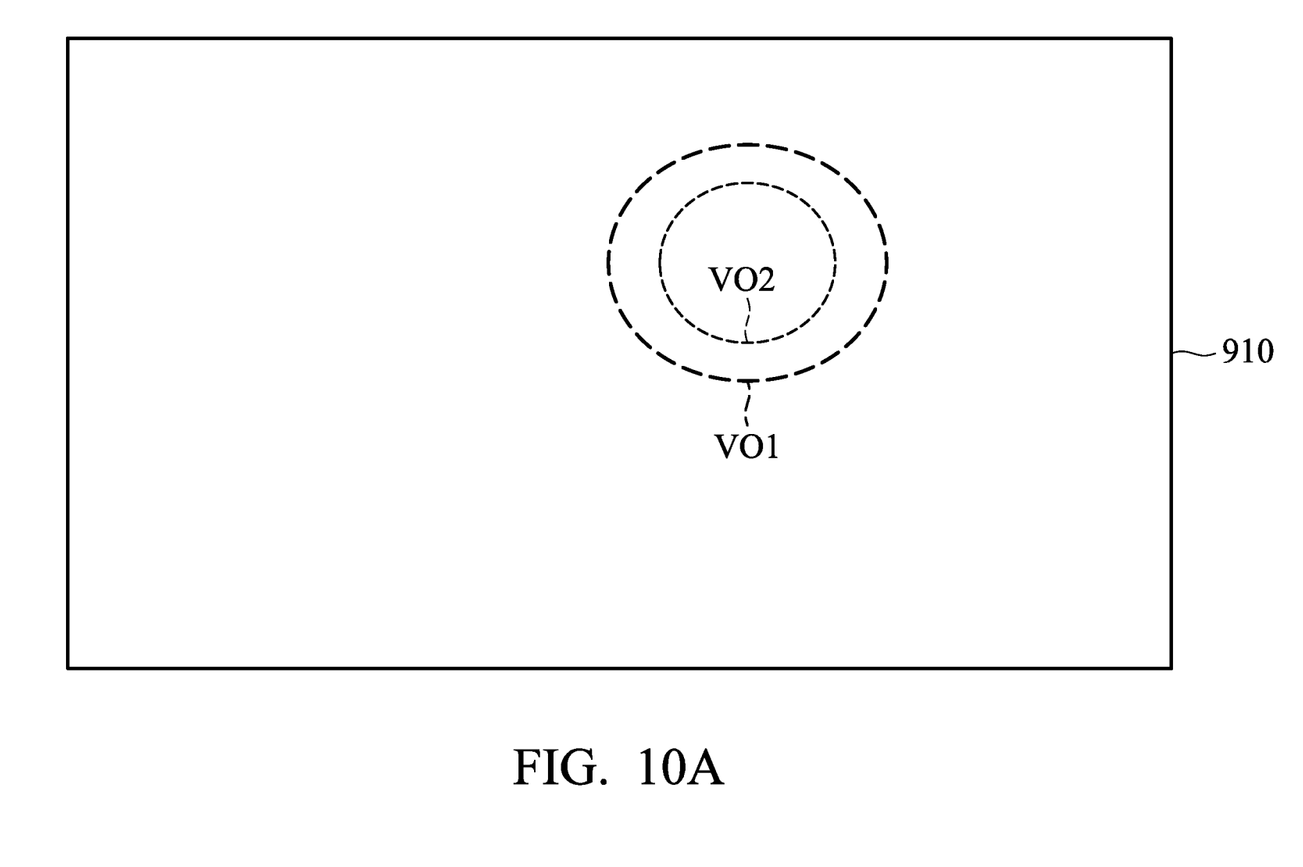
FIG. 10A shows an example of an image viewed by the user wearing the head mounted display apparatus.
Figure 10B:
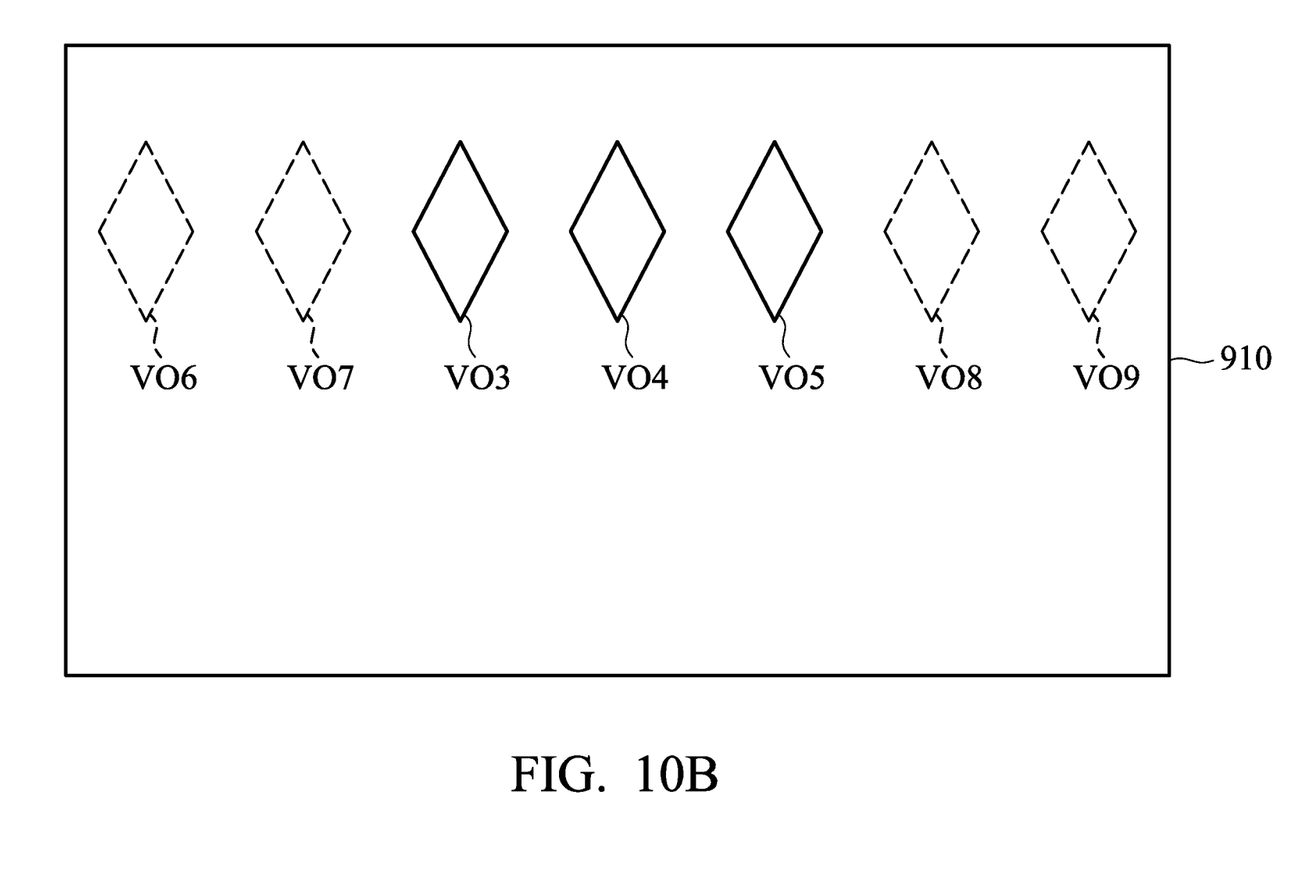
FIG. 10B shows another example of an image viewed by the user wearing the head mounted display apparatus.

FIG. 10A shows an example of the image 910 viewed by the user wearing the head mounted display apparatus 104, and FIG. 10B shows another example of the image 910 viewed by the user wearing the head mounted display apparatus 104. In the virtual reality system 10, the size of the virtual object shown in the image 910 can be adjusted to match the clear zone. For example, because the clear zone CZ2 of FIG. 9B is larger than the clear zone CZ1 of FIG. 9A, for the same virtual object, the virtual object shown in the image 910 corresponding to the clear zone CZ2 (e.g. VO1 of FIG. 10A) is larger than the virtual object shown in the image 910 corresponding to the clear zone CZ1 (e.g. VO2 of FIG. 10A). Specifically, the size of the virtual object shown in the image is directly proportional to the size of the clear zone. Furthermore, in the virtual reality system 10, the amount of virtual objects shown in the image 910 can be adjusted according the size of the clear zone. For example, for the virtual objects VO3-VO9 corresponding to the items/options that the user want to select, three virtual objects (e.g. VO3-VO5 of FIG. 10B) are shown in the image 910 corresponding to the clear zone CZ1, and seven virtual objects (e.g. VO3-VO9 of FIG. 10B) are shown in the image 910 corresponding to the clear zone CZ2. Thus, the amount of virtual objects shown in the image 910 corresponding to the clear zone CZ1 is less than the amount of virtual objects shown in the image 910 corresponding to the clear zone CZ2. Specifically, the amount of the virtual objects shown in the image is directly proportional to the size of the clear zone. By showing fewer virtual objects and arranging the virtual objects in the center of the image 910, the user can safely move in the smaller clear zone, thereby preventing the user from colliding with the obstructions.

Figure 11:
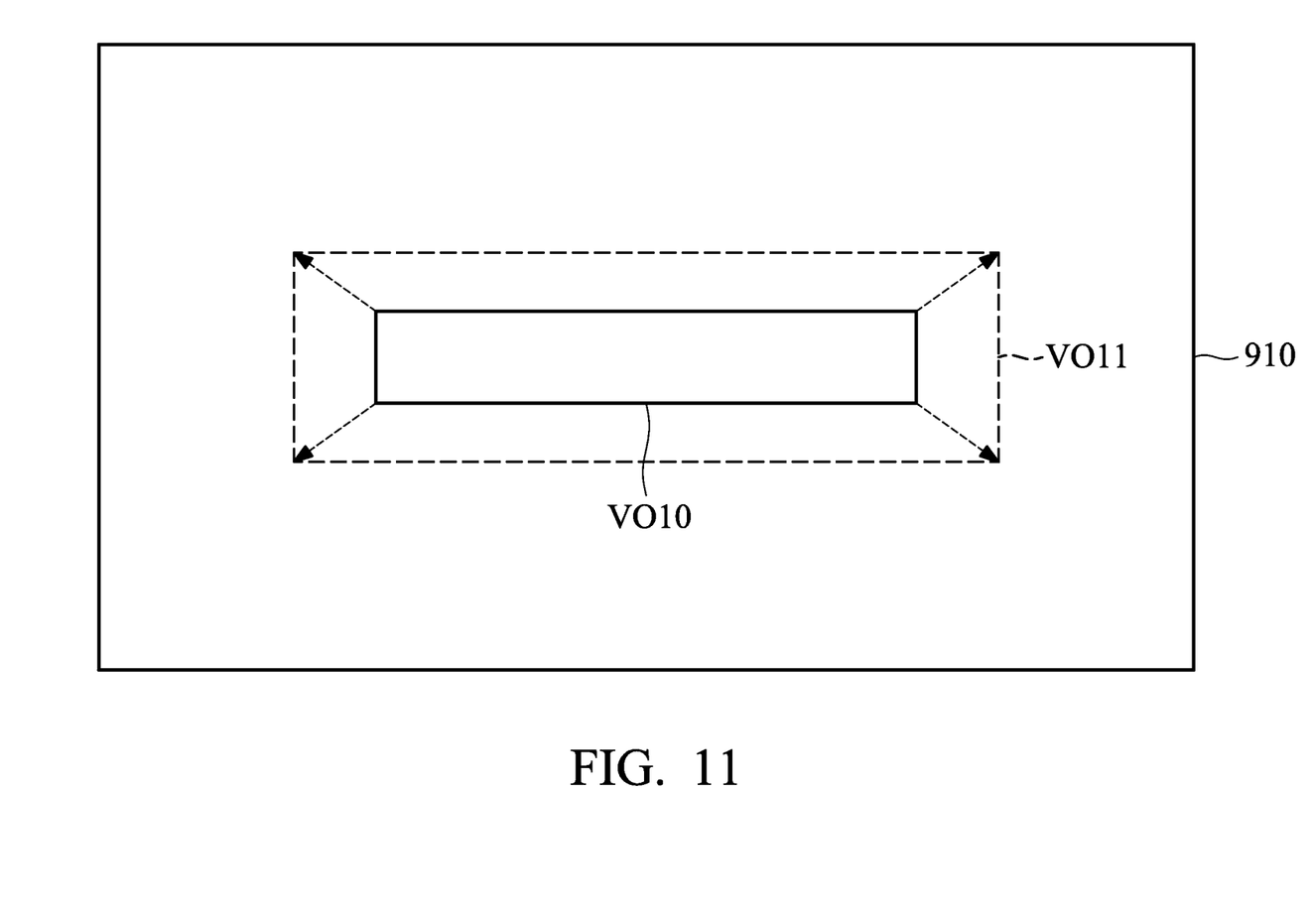
FIG. 11 shows another example of the image viewed by the user wearing the head mounted display apparatus.

Furthermore, when the user wearing the head mounted display apparatus 104 is moving in the clear zone, the size of the virtual object shown in the image 910 can be adjusted, so as to provide verisimilitude for the user. FIG. 11 shows another example of the image 910 viewed by the user wearing the head mounted display apparatus 104. Referring to FIG. 9A and FIG. 11 together, when the user is moving from position P4 to position P5 in the clear zone CZ1 of FIG. 9A, the virtual object VO10 of the image 910 viewed in position P4 is gradually increased until the user reaches position P5. Thus, the larger virtual object VO11 of the image 910 can be viewed by the user in position P5, wherein the adjustment speed in the size of the virtual object is determined according to the movement speed of the user, the size of the clear zone, and the distance between the user and the virtual object. For example, if the virtual object VO10 is a virtual table provided by an application performed by the virtual reality system 10, the virtual table will gradually become larger, so as to indicate that the user is approaching the virtual table, thereby increasing its presence as perceived by the user. Furthermore, for the adjustment speed in the size of the virtual object, the adjustment speed corresponding to the small room or the small clear zone is faster than the adjustment speed corresponding to the larger room or the larger clear zone. For example, when the distance between the user and the virtual object is decreased, the increase speed in the size of the virtual object corresponding to the small room is faster than the increase speed in the size of the virtual object corresponding to the larger room. Specifically, the adjustment speed in the size of the virtual object is inversely proportional to the size of the clear zone when the distance between the user and the virtual object is decreased.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A virtual reality system, comprising:
 a host device;
 a transmission cable; and
 a head mounted display apparatus worn by a user and electrically connected to the host device via the transmission cable, comprising:
 a multimedia module, receiving multimedia content from the host device via the transmission cable, and displaying a video part of the multimedia content;
 a multi-sensing module, obtaining sensing information regarding the head mounted display apparatus, the user and an obstruction; and
 a peripheral hub, providing the sensing information to the host device via the transmission cable, wherein the host device adjusts size or amount of virtual objects of the video part of the multimedia content in response to the sensing information from the peripheral hub, wherein a clear zone corresponding to the obstruction is obtained according to the sensing information, and wherein a size of the virtual object is adjusted according to a size of the clear zone or an adjustment speed, and the adjustment speed is determined according to movement speed of the user, size of the clear zone, and a distance between the user and the virtual object.

2. The virtual reality system as claimed in claim 1, wherein the multi-sensing module comprises:
   a position sensing device, obtaining position information corresponding to the head mounted display apparatus;
   a user sensing device, obtaining user information of the user; and
   an environment sensing device, obtaining environment information corresponding to the obstruction,
   wherein the multi-sensing module obtains the sensing information according to the position information, the user information, and the environment information.

3. The virtual reality system as claimed in claim 2, wherein the position information comprises movement information, orientation information, tilt angle information, and/or location information of the head mounted display apparatus; the user information comprises biometrical information about the user and/or eye view information; and the environment information comprises images/video and/or depth information captured by the environment sensing device.

4. The virtual reality system as claimed in claim 2, wherein the environment sensing device comprises at least two cameras disposed in a line, and the two cameras are disposed on the head mounted display apparatus according to a tilt angle, wherein the tilt angle of each of the cameras is determined according to the horizontal line and a center line of field of view of each camera.

5. The virtual reality system as claimed in claim 1, wherein when the sensing information indicates that a distance between the user wearing the head mounted display apparatus and the obstruction is shorter than a specific distance, a warning object is present.

6. The virtual reality system as claimed in claim 5, wherein speed and magnification of the warning object displayed by the multimedia module are determined according to movement speed of the user wearing the head mounted display apparatus or the distance between the user wearing the head mounted display apparatus and the obstruction.

7. The virtual reality system as claimed in claim 5, wherein the warning object is a virtual wall, and a height of the virtual wall is decreased when the distance between the user wearing the head mounted display apparatus and the obstruction is increased, and the height of the virtual wall is increased when the distance between the user wearing the head mounted display apparatus and the obstruction is decreased.

8. The virtual reality system as claimed in claim 1, wherein the size of the virtual object is directly proportional to a size of the clear zone.

9. The virtual reality system as claimed in claim 8, wherein an amount of the virtual objects is directly proportional to the size of the clear zone.

10. The virtual reality system as claimed in claim 1, wherein the adjustment speed is inversely proportional to the size of the clear zone when the distance between the user and the virtual object is decreased.

11. A method for controlling operation modes of a virtual reality system, wherein the virtual reality system comprises a host device, a head mounted display apparatus worn by a user, and a transmission cable coupled between the host device and the head mounted display apparatus, the method comprising:
   receiving multimedia content from the host device via the transmission cable by a multimedia module of the head mounted display apparatus, wherein the transmission cable is electrically connected between the host device and the head mounted display apparatus;
   displaying a video part of the multimedia content by the multimedia module of the head mounted display apparatus;
   obtaining sensing information regarding the head mounted display apparatus, the user and an obstruction by a multi-sensing module of the head mounted display apparatus;
   providing the sensing information to the host device via the transmission cable by a peripheral hub of the head mounted display apparatus; and
   obtaining a clear zone corresponding to the obstruction according to the sensing information;
   adjusting size or amount of virtual objects of the video part of the multimedia by the host device in response to the sensing information content from the peripheral hub of the head mounted display apparatus,
   wherein a size of the virtual object is adjusted according to a size of the clear zone or an adjustment speed, and the adjustment speed is determined according to movement speed of the user, size of the clear zone, and a distance between the user and the virtual object.

12. The method as claimed in claim 11, wherein the multi-sensing module comprises:
   a position sensing device, obtaining position information corresponding to the head mounted display apparatus;
   a user sensing device, obtaining user information of the user; and
   an environment sensing device, obtaining environment information corresponding to the obstruction,
   wherein the multi-sensing module obtains the sensing information according to the position information, the user information, and the environment information.

13. The method as claimed in claim 12, wherein the position information comprises movement information, orientation information, tilt angle information, and/or location information of the head mounted display apparatus; the user information comprises biometrical information about the user and/or eye view information; and the environment information comprises images/video and/or depth information captured by the environment sensing device.

14. The method as claimed in claim 12, wherein the environment sensing device comprises at least two cameras disposed in a line, and the two cameras are disposed on the head mounted display apparatus according to a tilt angle, wherein the tilt angle of each of the cameras is determined according to the horizontal line and a center line of field of view of each camera.

15. The method as claimed in claim 11, wherein when the sensing information indicates that a distance between the user wearing the head mounted display apparatus and the obstruction is shorter than a specific distance, a warning object is present.

16. The method as claimed in claim 14, wherein speed and magnification of the warning object displayed by the multimedia module are determined according to movement speed of the user wearing the head mounted display apparatus or the distance between the user wearing the head mounted display apparatus and the obstruction.

17. The method as claimed in claim 15, wherein the warning object is a virtual wall, and a height of the virtual wall is decreased when the distance between the user wearing the head mounted display apparatus and the obstruction is increased, and the height of the virtual wall is increased when the distance between the user wearing the head mounted display apparatus and the obstruction is decreased.

18. The method as claimed in claim 11,
wherein a size of the virtual object is directly proportional to a size of the clear zone.

19. The method as claimed in claim 11, wherein the adjustment speed is inversely proportional to the size of the clear zone when the distance between the user and the virtual object is decreased.

* * * * *